(12) United States Patent
Merrigan et al.

(10) Patent No.: US 10,549,246 B2
(45) Date of Patent: Feb. 4, 2020

(54) STATIC MIXER

(71) Applicant: The Procter & Gamble Company, Cincinnati, OH (US)

(72) Inventors: Steven Ray Merrigan, West Chester, OH (US); Aleksey Pinyayev, Cincinnati, OH (US); Billy Ray Dawson, Mason, OH (US); Julie McWilliams, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 357 days.

(21) Appl. No.: 14/974,551

(22) Filed: Dec. 18, 2015

(65) Prior Publication Data

US 2016/0175787 A1     Jun. 23, 2016

(30) Foreign Application Priority Data

Dec. 18, 2014   (EP) ..................................... 14198985

(51) Int. Cl.
   B01F 5/06      (2006.01)
   B01F 3/08      (2006.01)
   (Continued)

(52) U.S. Cl.
   CPC ............ B01F 5/061 (2013.01); B01F 3/0807 (2013.01); B01F 3/0861 (2013.01); B01J 19/24 (2013.01); *B01F 2005/0097* (2013.01); *B01F 2005/062* (2013.01); *B01J 2219/24* (2013.01); *B33Y 10/00* (2014.12); *B33Y 80/00* (2014.12)

(58) Field of Classification Search
   CPC ........ B01F 2005/0097; B01F 2005/062; B01F 3/0807; B01F 3/0861; B01F 5/061; B01F 5/0619; B01J 2219/24; B33Y 10/00; B33Y 80/00
   See application file for complete search history.

(56) References Cited

U.S. PATENT DOCUMENTS 2,894,732 A * 7/1959 Taber .................. B01F 15/0475
                                                       239/428
3,286,992 A * 11/1966 Armeniades .......... B01F 5/0615
                                                       366/339

(Continued)

FOREIGN PATENT DOCUMENTS

| DE | 202014002444 | 4/2014 |
|---|---|---|
| WO | WO2007/032810 | 3/2007 |
| WO | WO2007/113627 | 10/2007 |

OTHER PUBLICATIONS

Somos® NanoTool, Product Data Sheet, 2012, 2 pages (Year: 2012).*

(Continued)

*Primary Examiner* — Tony G Soohoo
(74) *Attorney, Agent, or Firm* — William E. Gallagher; Andres E. Velarde

(57) ABSTRACT

A static mixer created using an additive process is disclosed. The static mixer is enabled to homogenously blend two fluids flowing in a pipe. The static mixer exhibits zero contact angle in relation to the two fluids being mixed within the pipe. The static mixer exhibits a first contact angle with the first fluid and a second contact angle with the second fluid. The first contact angle is either between 0 and 30 or greater than 85. The second contact angle is either between 0 and 30, or greater than 85.

5 Claims, 4 Drawing Sheets

(51) Int. Cl.
*B01J 19/24* (2006.01)
*B01F 5/00* (2006.01)
*B33Y 10/00* (2015.01)
*B33Y 80/00* (2015.01)

(56) References Cited

U.S. PATENT DOCUMENTS

| | | | | |
|---|---|---|---|---|
| 3,620,506 A * | 11/1971 | So | B01F 5/0619 | 366/337 |
| 3,704,006 A * | 11/1972 | Grout | B01F 5/0615 | 210/758 |
| 3,865,352 A * | 2/1975 | Nelson | B01F 3/10 | 138/42 |
| 4,019,719 A * | 4/1977 | Schuster | B01F 5/0619 | 366/338 |
| 4,051,065 A * | 9/1977 | Venema | B01F 3/088 | 138/42 |
| 4,061,313 A * | 12/1977 | Brauner | B01F 5/0619 | 366/340 |
| 4,062,524 A * | 12/1977 | Brauner | B01F 5/0619 | 138/37 |
| 4,211,277 A * | 7/1980 | Grosz-Roll | B01F 5/0619 | 138/38 |
| 4,538,920 A * | 9/1985 | Drake | B01F 5/0615 | 222/137 |
| 4,755,325 A * | 7/1988 | Osgerby | B01F 3/0807 | 366/176.2 |
| 4,758,098 A * | 7/1988 | Meyer | B01F 5/0619 | 366/336 |
| 4,806,288 A * | 2/1989 | Nowosinski | B01J 19/30 | 261/94 |
| 5,171,613 A * | 12/1992 | Bok | B01F 5/0619 | 118/667 |
| 5,221,710 A * | 6/1993 | Markusch | C08G 18/0804 | 524/591 |
| 5,244,941 A * | 9/1993 | Bruckbauer | B29C 33/0077 | 428/15 |
| 5,246,855 A * | 9/1993 | Katinger | C12M 23/24 | 435/286.1 |
| 5,372,421 A * | 12/1994 | Pardikes | B01F 3/088 | 137/7 |
| 5,520,460 A * | 5/1996 | Lantz | B01F 5/0602 | 29/469 |
| 5,564,827 A * | 10/1996 | Signer | B29C 45/581 | 366/336 |
| 5,620,252 A * | 4/1997 | Maurer | B01F 5/0619 | 366/337 |
| 5,639,070 A * | 6/1997 | Deckard | B33Y 40/00 | 264/434 |
| 5,732,323 A * | 3/1998 | Nyrhila | B22F 3/1007 | 419/2 |
| 5,813,762 A * | 9/1998 | Fleischli | B01F 5/0619 | 138/42 |
| 5,938,328 A * | 8/1999 | Pinto | B01F 5/0451 | 366/174.1 |
| 5,971,603 A * | 10/1999 | Davis | B01F 5/061 | 366/337 |
| 6,109,781 A * | 8/2000 | Ogasawara | B01F 5/061 | 366/336 |
| 6,676,892 B2 * | 1/2004 | Das | B22F 3/1055 | 419/7 |
| 7,735,522 B2 * | 6/2010 | Bivin | G05D 7/0186 | 138/37 |
| 8,641,267 B2 * | 2/2014 | Baeuerle | B01F 5/061 | 366/338 |
| 2001/0033527 A1 * | 10/2001 | Smith | B01F 5/0619 | 366/337 |
| 2002/0057627 A1 * | 5/2002 | Schubert | B01F 5/0644 | 366/336 |
| 2002/0064087 A1 * | 5/2002 | Catalfamo | B01F 5/061 | 366/337 |
| 2002/0118598 A1 * | 8/2002 | Schuchardt | B01F 5/0619 | 366/337 |
| 2003/0165080 A1 * | 9/2003 | Pinyayev | B01F 5/0619 | 366/337 |
| 2004/0037161 A1 * | 2/2004 | Honda | B01F 3/0807 | 366/176.1 |
| 2004/0159616 A1 * | 8/2004 | Cohee | A61L 2/0035 | 210/767 |
| 2004/0218469 A1 * | 11/2004 | Unterlander | B01F 5/0645 | 366/336 |
| 2005/0185508 A1 * | 8/2005 | Schulz-Hanke | B01F 1/0027 | 366/336 |
| 2008/0056064 A1 * | 3/2008 | Tanaka | B01F 5/0451 | 366/339 |
| 2009/0079107 A1 * | 3/2009 | Abiru | B01F 5/0451 | 264/216 |
| 2009/0103393 A1 * | 4/2009 | Moser | B01F 5/0451 | 366/152.1 |
| 2009/0122638 A1 * | 5/2009 | Sato | B01F 3/0861 | 366/339 |
| 2010/0003391 A1 * | 1/2010 | Melnyczuk | B01F 5/0451 | 426/573 |
| 2010/0110826 A1 * | 5/2010 | D'herde | B01F 5/0619 | 366/337 |
| 2010/0202248 A1 * | 8/2010 | Hirschberg | B01F 3/10 | 366/337 |
| 2011/0080801 A1 * | 4/2011 | Georg | B01F 3/10 | 366/337 |
| 2011/0128814 A1 * | 6/2011 | Hanada | B01F 5/0614 | 366/339 |
| 2011/0150703 A1 * | 6/2011 | Castro | B01F 5/061 | 422/68.1 |
| 2011/0176965 A1 * | 7/2011 | Castro | B01F 5/0645 | 422/69 |
| 2011/0305104 A1 * | 12/2011 | McGuire | B01F 5/0619 | 366/337 |
| 2011/0310697 A1 * | 12/2011 | Hirschberg | B01F 3/06 | 366/337 |
| 2012/0077992 A1 * | 3/2012 | Hutter | B01F 5/0451 | 549/315 |
| 2012/0106290 A1 * | 5/2012 | Meijer | B01F 3/0861 | 366/337 |
| 2012/0134232 A1 * | 5/2012 | Schneider | B01F 5/0619 | 366/336 |
| 2012/0193841 A1 * | 8/2012 | Wang | B22F 3/1055 | 264/645 |
| 2013/0021868 A1 * | 1/2013 | Doolin | B01F 5/0415 | 366/154.1 |
| 2013/0107660 A1 * | 5/2013 | Pappalardo | B01F 5/0617 | 366/336 |
| 2015/0246484 A1 * | 9/2015 | Hirschberg | B01F 5/0619 | 366/336 |
| 2015/0298075 A1 * | 10/2015 | Glanville | B01F 5/0605 | 366/338 |
| 2016/0175787 A1 * | 6/2016 | Merrigan | B01F 5/0619 | 210/757 |
| 2016/0375458 A1 * | 12/2016 | McNeil | B41F 31/26 | 427/428.01 |
| 2017/0252708 A1 * | 9/2017 | Pappalardo | B01F 5/061 | |
| 2017/0321083 A1 * | 11/2017 | Fenn | C09D 175/02 | |

OTHER PUBLICATIONS

PCT ISA 237—Written Opinon for PCT/US2015/065652, 11 pages. (Year: 2015).*
Somos® NanoTool, MSDS Data Sheet, 2016, 5 pages (Year: 2006).*
Surface Energy Data for PTFE: Polytetrafluoroethylene, CAS # 9002-84-0, © 2009 Diversified Enterprises, 3 pages (Year: 2009).*
Fowkes, Determination of Interfacial Tensions, Contact Angles, and Dispersion Forces in Surfaces by Assuming Additivity of Intermolecular Interactions in Surfaces, Communications to the Editor, vol. 66, pp. 392, 1 page total. (Year: 1961).*

(56) References Cited

OTHER PUBLICATIONS

Fowkes, Attractive Fores at Interfaces, The Interface Symposium-5, Industrial and Engineering Chemistry vol. 58 No. 12 Dec. 1964, pp. 40-52, total 13 pages. (Year: 1964).*
Somos NanoTool Now Commercially Available—https://www.digitalengineering247.com/article/somos-nanotool-now-commercially-available; Digital Engineering, 4 pages, 2006. (Year: 2003).*
Somos NanoTool Now Commercially Available—Autocentral.com; https://www.autocentral.com/doc/somos-nanotool-now-commercially-available-0001, 2 pages, 2006 (Year: 2006).*
Correlation of Oil-Water and Air-Water Contact Angles of Diverse Silanized Surfaces and Relationship to Fluid Interfacial Tensions—Jay W. Grate et al. ; https://pubs.acs.org/sharingguidelines; pp. 7182-7188, 2012. (Year: 2012).*
A review on 3D micro-additive manufacturing technologies—Mohammad Vaezi et al.; Int J Adv Manuf Technol (2013) 67:1721-1754, Copyright—Springer-Verlag London 2012. (Year: 2012).*
History of additive manufacturing by Terry Wohlers and Tim Gornet, Wohlers Associates, Inc. 26 pages. Copyright © 2012 (Year: 2012).*
PCT International Search Report, dated Jun. 6, 2016, 20 pages.

* cited by examiner

STATIC MIXER

FIELD OF THE INVENTION

The present invention relates to static mixers. The static mixer may be made by an additive manufacturing process, may be porous, and may have variant surface properties.

BACKGROUND OF THE INVENTION

In the processing of fluids, in particular of fluids flowing in pipes, the use of devices called static mixers is widely known. A static mixer essentially consists of an articulated, three-dimensional, solid structure, i.e. consisting of multiple elements having planar or curved surfaces, variously arranged and angled to the flow direction, suitable to cause continuous breakdowns of the fluid stream flowing in the pipe, leading a strong turbulence in the same which cause a quick stirring of the individual threads of the stream, until obtaining a blending thereof sufficiently uniform for the specific application.

The introduction of static mixers in pipes provides a simple solution to mixing fluids. Static mixtures are traditionally manufactured by mechanical machining of the individual elements of the structure and the subsequent assembly thereof, for example by welding or other conventional, mechanical anchoring methods, to finally form the three-dimensional structure which characterizes these devices.

Besides the remarkable advantages in terms of functionality, cost-effectiveness, flexibility, and efficiency of the above-mentioned static mixers, they also have some substantial disadvantages, due precisely to the need of assembling different elements and components to form the internal structure intended to accomplish the mixing. The joints between said components and between the same and the pipe cause roughness, defective or irregular welding lines, sharp changes of direction and/or of inclination and so on, with the consequent formation of undesirable dead corners. This causes an undesirable phenomenon, i.e. the formation of stagnation zones or in any case zones wherein a slowing-down of fluid flow takes place, in correspondence whereof the individual products being blended may undergo degradation (in particular, depending on the nature of the fluids processed, a decrease but also an increase in viscosity, as well as an alteration of other chemical-physical properties or of the chemical structure itself), resulting in the risk of defects of and damage to the final product obtained from the processing of the blended products. Further, static mixers are traditionally made with solid materials that are made smooth and have uniform surface properties.

As such, there is a need to create a static mixer that does not rely upon mechanical methods for joining the structure. Further, there is a need for static mixer that allows for controlled changes to the mixer material to thereby improve upon the static mixer itself. Lastly, there exists a need to create a static mixer that is tailored to the fluids that are mixed.

SUMMARY OF THE INVENTION

A static mixer is disclosed. The static mixer is enabled to homogenously blend a first fluid and a second fluid flowing in a pipe without the use of rotating parts. The static mixer exhibits a first contact angle with the first fluid and a second contact angle with the second fluid. The first contact angle is either between 0 and 30 or greater than 85. The second contact angle is either between 0 and 30 or greater than 85.

A method of mixing a plurality of fluids is disclosed. The method includes mixing a first fluid with a second fluid using a static mixer. The static mixer exhibits a first contact angle with the first fluid and a second contact angle with the second fluid. The first contact angle is either between 0 and 30 or greater than 85. The second contact angle is either between zero and 30, or greater than 85. The first and second fluids are either both between zero and 30 or greater than 85 or one of the two fluids is greater than 85 and the difference between the contact angles is greater than 60.

DESCRIPTION OF THE DRAWINGS

The drawings are illustrative in nature and not intended to limit the subject matter defined by the claims. The following detailed description can be understood when read in conjunction with the following drawings, where like structure is indicated with like reference numerals and in which:

DETAILED DESCRIPTION OF THE INVENTION

Figure 1:
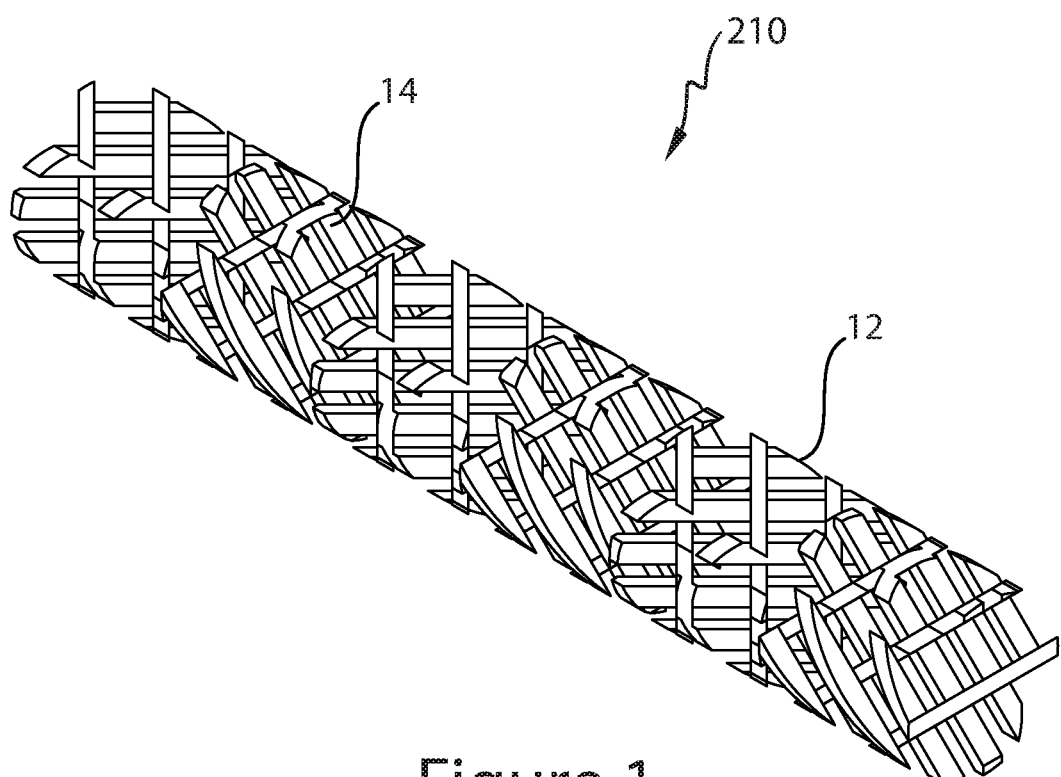
FIG. 1 schematically depicts a static mixer according to one or more examples shown and described herein.

Disclosed is a static mixer having improved properties. The static mixer may have improved surface properties, may be porous, and may be impregnated with a variety of auxiliary fluids having different physical and chemical characteristics such as surface tension, viscosity, pH, catalytic properties and so on.

Also disclosed is a static mixer that may be made with high surface roughness. High surface roughness may result from the process of manufacturing of the mixer or be added to a pre-manufactured mixer by a post-treatment such as sand-blasting. The composition of the static mixer may be chosen based upon the fluids being mixed.

The object of the present invention is hence to eliminate the disadvantages of known-type static mixers, providing a method for manufacturing static mixing device of the threads of a stream, which is highly efficient and, at the same time, capable of preventing the formation of dead corners in the path of fluid through the device, due to the absence of discontinuities, angles and sharp edges, welding lines, joints or other mounting imperfections between various components. Further, the static mixer disclosed may have improved properties regarding surface roughness, surface structures, may be porous, and may be impregnated with an auxiliary substance. The auxiliary substance may be a fluid or a solid.

The object of the present invention is to provide a particularly simple and effective process for manufacturing static mixers of any shape and geometry, avoiding discontinuities, angles and sharp edges, welding lines, joints or other mounting imperfections in the structure thereof.

This allows for the production of static mixers with surface characteristics that enable 1) higher more stable water to oil ratio emulsions, 2) the ability to optimize the mixer for processing fluids, 3) a higher throughput via back pressure reduction, 4) the ability to fabricate the mixers to fit into non-standard fittings, 5) the ability to fabricate mixer designs that include injection points for additional fluids, 6)

improved control of emulsion cell sizes and homogeneity of distributions, and 7) faster and more efficient emulsion making.

The static mixer may be improved by providing a static mixer made from porous material with its pores being open and in fluid communication with one another; providing a static mixer with high surface roughness; providing a static mixer with surface structures; providing a static mixer with surfaces having zero contact angle relative to any fluid being processed by such a mixer; Providing a static mixer with surfaces having maximum difference of contact angle relative to each phase of a two phase mixture for making emulsions; and providing a static mixer with a non-wetting surface for mixing single phase components.

The static mixer may have surface structures. The surface structures may be channels, cones, pyramids, wells, indentations, grooves, or any other formation that is above or below the plane of an element planar or curved surface. The surface structures may be disposed in a standard pattern or in a random pattern.

The static mixer may be improved by providing a static mixer made from a material, like Nano Tool, having zero contact angle relative to any fluid being processed by such a mixer as the inventors unexpectedly found, may significantly improve the performance of the static mixer when making emulsion and high internal phase emulsions. In an embodiment, the materials may be chosen based upon the fluids being mixed.

The use of the disclosed static mixer for making emulsions may improve upon the emulsion making process. Static mixers are used in the production of various types of emulsions including consumer products, such as, for example, hair care products, beauty care products including but not limited to bodywash and lotions, absorbent foams, dish soaps, and laundry care products including but not limited to detergents. The static mixers disclosed herein may be used in the process for the production of absorbent foams, such as those described in U.S. Pat. No. 5,149,720 (DesMarais et al), issued Sep. 22, 1992; U.S. Pat. No. 5,827,909 (DesMarais) issued Oct. 27, 1998; and U.S. Pat. No. 6,369,121 (Catalfamo et al.) issued Apr. 9, 2002.

Without being bound by theory, it is believed that varying surface characteristics of static mixers, from having zero contact angles relative to both phases, having minimal difference in contact angle relative to both phases, or from maximizing the difference in contact angles relative to both phases, yield HIPEs with different cell sizes and distributions under identical mixing conditions which affords the opportunity to tailor the resulting emulsion cell size and distribution to desired application. Further, by tailoring the static mixer to the fluids being mixed, one can reduce the back pressure created in the system.

The following sets forth a broad description of numerous different examples of the present disclosure. The description is to be construed as exemplary only and does not describe every possible combination of elements since describing every possible combination of elements would be impractical, if not impossible. It will be understood that any feature, characteristic, component, composition, ingredient, absorbent article, step or methodology described herein can be deleted, combined with or substituted for, in whole or part, any other feature, characteristic, component, composition, ingredient, absorbent article, step or methodology described herein. Numerous alternative combinations could be implemented, using either current technology or technology developed after the filing date of this patent, which would still fall within the scope of the claims.

As used herein, the term "comprising" means that the various components, ingredients, or steps, can be conjointly employed in practicing the present invention. Accordingly, the term "comprising" encompasses the more restrictive terms "consisting essentially of" and "consisting of." Other terms may be defined as they are discussed in greater detail below.

As used herein, "interior" refers to any portion of a mixer that does not form a portion of the outer surface of the static mixer. In some examples, the interior of a product or packaging may include one or more of internal surfaces and internal components.

FIG. 1 shows a static mixer 10. The static mixer comprises an outer cylindrical shape that allows the mixer to be housed within a circular pipe. The static mixer 10 includes an internal three-dimensional structure that comprises a plurality of elements 12. The elements 12 are made of a plurality of surfaces 14. The surfaces 14 may be planar or curved. The elements 12 may have different shapes, positions, and angles within the three-dimensional structure.

According to the basic feature of the invention, the individual elements forming the inner structure of the mixer have no discontinuities and are made without mechanical joints, hence forming a single, monolithic block.

In order to achieve this result, static mixer may manufactured by any additive manufacturing process such as, e.g., selective laser sintering process forming subsequent layers, commonly known as SLS process. Other examples of additive manufacturing processes include stereolithography (SLA), fused deposition modeling (FDM), and selective laser melting (SLM). The static mixer may be created from a three-dimensional drawing of the desired static mixer, in particular a drawing of the inner structure of the static mixer. The drawing may be produced on a computer or processor using a CAD software or similar program.

In an embodiment, the static mixer may be formed starting from suitable powder compounds, through a sintering process, in particular through the selective application of a laser beam which causes partial melting of subsequent layers of the above-said powder compounds, said laser beam being guided by a processor according to the various drawings of corresponding subsequent sections of the static mixer, each one derived in succession from the above-said overall three-dimensional drawing. The static mixer formed is fully free from welding lines or other types of joints between different elements or components, since it consists of a powder-sintered product. Further, due to the lack of welding lines and other types of joints, the static mixer exhibits a higher level of specificity and correlation to the CAD design.

The static mixer may be made from any material that can be used in an additive manufacturing process. Examples of materials include thermoplastic polymers, ceramics, metals, and composites of the stated materials such as, for example, Nano Tool which is a known ceramic based composite. The materials may be used as powder compounds in the manufacturing process, according to the mechanical features desired for the final product. In the case of metal products, such as, for example, steel microspheres, the steel microspheres previously coated with a layer of thermoplastic polymeric material or of low-melting metals, for example alloys with a copper, zinc and tin base, whose partial melting makes the sintering process possible.

The material may be chosen for the purpose of a chemical reaction. In an embodiment, the static mixer may contain a material that will have a chemical reaction between the static mixer and one or more of the fluids. In an embodiment, the chemical reaction may be selected from the group comprising oxidation, reduction, catalytic driven reactions, or combinations thereof. One of ordinary skill in the art will understand that other types of chemical reactions may also be contemplated.

Different materials may be chosen to impact the surface properties of the overall static mixer. For example, different materials will impact the surface energy and contact angle of the static mixer. The materials may also be chosen to impart a set surface roughness.

In an embodiment, the static mixers obtained from metal powders sintered with the additive manufacturing process may be later subjected to heat infiltration by capillarity using melted metals or metal alloys, or may undergo thermal treatments for the stabilization of the obtained sintering.

In an embodiment, a finishing coating may be applied to a surface of the static mixer, such as, for example, an inner surface. The coating may give the static mixer special features of low friction or of wear resistance, or other special chemical-physical properties. Said coating may consist for example of a plastic material, such as PTFE (Teflon), or of a metal material, such as nickel, applied by chemical deposition from a salt in a solution.

In an embodiment, the static mixer may be made porous. As used herein, a static mixer that is made porous means that the material comprising the static mixer is porous. Porous material static mixers allow for two fluids to be mixed in the mixer at the pores, the impregnation of a fluid immiscible with both process fluids, and the insertion of added fluids. Without being bound by theory, it is believed that the pores of the porous material static mixer change the surface characteristics of the static mixer. Additionally, pores may be filled with something that changes surface characteristics such as, for example, a solid or a liquid. In an embodiment, the pores may be impregnated with a fluid that is immiscible with one or both of the process fluids being mixed in the static mixer. The additional solid or fluid may be distributed in the static mixer in a controlled manner, such as, for example in a bimodal structure. The distribution of the additional solid or fluid may be done in any manner that enables the desired outcome. The distribution may be done by, for example, having a marbled areas within the mixer or having mixer areas that exhibit different properties within a single static mixer.

The static mixer performance may be achieved via a variety of materials and methods of manufacture. In an embodiment, a porous material static mixer can be manufactured by Selective Laser Sintering (SLS) technology using glass-filled Nylon 12 material. SLS technology builds the part from particles bound together by localized melting with a laser beam. Such method creates a structure with open pores and channels in fluid communication with one another. A static mixer with high surface roughness can also be made from Nylon 12 material by SLS technology if the sintering process parameters, such as laser beam energy and heating time are set to substantially different values than these used for making the porous material part.

The object of the invention is a static mixer, which mixer may be introduced in a pipe or which may be associated with the same, for blending a fluid flowing in such pipe. Such process provides a sintering step of a product in a powder form, so as to obtain a static mixer consisting of an outer cylindrical portion and of an inner blending structure 3 formed integrally, with no discontinuities, welding lines or mechanical connections. Said sintering step is performed according to the SLS process, i.e. it provides the use of a laser beam with a selective action on layers of said powder material applied in succession.

In particular, the sintering step provides the sintering of a product made of plastic material, such as for example polyamide (Nylon).

Sintering may be performed with a synthetic powder material having a low melting temperature, so as to then manufacture an intermediate ceramic mold and then a final product of metal material with a high melting temperature, through a lost-wax casting process.

The sintering step comprises a plurality of successive sintering steps, through the action of a laser beam on a plurality of working planes (according to a mode known per se in the context of SLS processes). Thereby, the mixer consists of a plurality of layers (corresponding to said plurality of successive sintering steps), juxtaposed according to a set direction, i.e. the advancement direction of the sintering process. In the standard application of the SLS process there is provided that each working plane (whereon the laser beam acts on each occasion in said succession of sintering steps) is perpendicular to the longitudinal axis of the mixer resulting from the sintering. In the sintering step according to the present invention, however, it is possible and useful to employ sintering processes with layers which may be oriented differently, according to any angle lying between 0 deg. and 90 deg. to the longitudinal axis of the manufactured mixer, according to an optimization of the manufacturing process and of the fluid-dynamic conditions provided within the mixer. As a matter of fact, since the SLS sintering process leaves in the raw product a thin line between successive layers, it is possible to arrange such line so that it interferes positively with the blending process.

Moreover, said process can provide, following the sintering step, a heat treatment step of the sintered mixer, so as to stabilize the sintering or in order to achieve an infiltration by capillarity of a metal material into a porous material portion of said structure. The infiltration is achieved, for example, simply by introducing the sintered product into an oven, in contact with a metal block, preferably a bronze one, so that when said metal melts it can seep by capillarity into the pores of the sintered product. Said heat treatment or infiltration step allows to make the mixer more solid and homogeneous, eliminating or reducing gaps and porosity.

The process finally can also provide a possible step for the application of a coating to an inner surface of the mixer, after the sintering step and after the heat treatment/infiltration step, if any. In particular, said coating step provides a chemical deposition step, from a solution of a metal salt, on the surface of the mixer in working contact with the fluid to be mixed, or an electrochemical-deposition step from a metal salt solution. As an alternative to the above said metal coating, or in addition thereto, the coating step provides the coating with a plastic material through a melting step of plastic material powders, or a dipping step of the mixer in a thermoplastic liquid mixture or in a solution comprising a thermosetting plastic material.

The surface coating briefly described above allows to obtain different degrees of finish compared to the raw sintered piece, and hence special chemical-physical properties of the surface in contact with the fluid, optimized according to the possible chemical interactions with the fluid or to an increased resistance to wear.

For some types of applications it may be necessary or preferable for the surface of the mixer inner walls to be free from the typical parallel lines characteristic of the SLS manufacturing processes, or at least for the height of the same to be substantially lower. This result may be achieved by introducing in the process of the present invention a smoothing step of the mixer inner surface, said step preferably occurring just before the finishing coating step.

The above-said smoothing step may be performed chemically or mechanically. In the former case, an acidic solution having a similar composition to those commonly used in chemical polishing processes of stainless steel pipes for food use is made to flow inside the static mixer for a time sufficient to obtain the necessary degree of smoothness. In the second case, a preferred mode of mechanical smoothing—considering the high complexity of the geometries involved—is that obtainable through a sanding process accomplished in a machine, preferably of the closed-circuit type, which injects high-speed, compressed air mixed with abrasive sands into the static mixer. It is useful to notice that in both cases the smoothing processes are fluid-dynamic, so that precisely those areas are automatically smoothed to a higher degree, which will later experience a more intense flow of working fluid, in terms of flow rate or speed.

Applicants have found that using different materials allows for the ability to create a static mixer that changes bulk and surface properties based upon the materials.

The material the mixer may be made from porous material with its pores being open and in a fluid communication with one another.

Applicants have further found that porous materials may be impregnated with one of a variety of the auxiliary fluids having different physical and chemical characteristics such as surface tension, viscosity, pH, catalytic properties and so on. During processing by a static mixer made from such porous and impregnated material, the process fluids will interact with the auxiliary fluids exposed in the pores on the mixer's surfaces. Without being bound by theory, it is believed that impregnating the porous material with one of a variety of auxiliary fluids may significantly improve the performance of the static mixer.

In an embodiment, the static mixer may be heated or cooled prior to contacting the fluids or during use with the fluids. The mixer may have an electrode used to heat the material. The electrode may be made part of the mixer during the additive manufacturing process or added after the mixer has been made.

The surfaces of the static mixer may be made with high surface roughness. This high surface roughness may result from the process of manufacturing of the mixer or be added to a pre-manufactured mixer by a post-treatment such as sand-blasting. Without being bound by theory, it is believed that High surface roughness, may impact the performance of the static mixer. Applicants have found that the material of the static mixer and the roughness of its surfaces can be programmed to result in a surface that has a contact angle between zero and thirty or greater than eighty five relative to any of the fluids being processed by such a mixer. This angle is measured by a standard method involving placing a drop of fluid on the hard surface, observing this droplet in contact with the hard surface under a microscope and measuring the angles between the hard surface and the surface of the droplet. When contact angle relative to any fluid, processed by the mixer, is close to zero, as inventors unexpectedly found, this may significantly improve the performance of the static mixer.

Applicants have found that static mixers that are programmed according to the contact angle in relation to the individual fluids being mixed result in lower back pressure. In an embodiment, a static mixer used to mix a first fluid and second fluid wherein the contact angle with the first fluid is 0 and 30 or 85 and above and wherein the second contact angle is either between 0 and 30, or 85 and above may result in lower back pressure when the contact angle of both fluids is between zero and 30 or greater than 85 or when one of the two fluids is greater than 85 and the difference between the contact angles is greater than 60.

Applicants have further found that the material of the static mixer and its surfaces can be programmed to result in a surface that has a large difference in contact angles relative to the different fluids of a two phase component system that is designed for making emulsions. Applicants have found differences in cell size and cell size homogeneity compared to mixing with statics with similar contact angles under identical process conditions.

The material of the static mixer and its surfaces can be programmed to result in a non-wetting surface (high contact angle) relative to any fluids in a single component system to reduce back pressure.

As shown in the table below, the contact angle of the static mixer in relation to the first fluid and the second fluid being mixed may be calculated. As indicated in the table, Nylon and Stainless steel are not preferred materials due to their contact angles. Stainless steel does not have a contact angle of both fluids that is between 0 and 30 or greater than 85. Nylon also does not fall in to the preferred contact angle ranges.

| Material | Angle to Water | Angle to Oil |
| --- | --- | --- |
| Stainless Steel | 0 | 52 |
| Nylon | 0 | 76 |
| Nano Tool | 0 | 0 |
| Silicone | 0 | 81 |
| PT-113P | 42 | 107 |

A static mixer with zero contact angle relative to two fluids can be made from Nano Tool material provided by Proto Labs, and can be made by a standard stereo lithography technology.

The performance advantages of the aforementioned improved mixers include lower pressure drop across the mixer, higher maximum water/oil ratios of emulsions and more control of cell size and more uniform cell size distribution in these emulsions. Applicants have found that static mixers created by an additive manufacturing process are robust in emulsion making processes up to at least 1000 PSI of localized back pressure without noticeable degradation of static mixer material, such as, for example, between 1 PSI and 900 PSI, 20 PSI and 800 PSI, 30 PSI and 700 PSI, 40 PSI and 600 PSI, 50 PSI and 500 PSI, 60 PSI and 400 PSI, 70 PSI and 300 PSI, or 100 PSI and 200 PSI. Applicant have found that, for the purpose of mixing emulsions, an additive manufacturing process static mixer enabled to have a pressure drop of between 0.001 and 5 PSI per element is sufficient for the intended purpose. Additionally, as discussed above, the additive process static mixers described allow for material compatibility between the static mixer and the fluids that are mixed. Without being bound by theory, Applicants have found that a lack of compatibility with oil phase is important for mixing emulsions. Therefore, finding a material that does not degrade due to the exposed chemistry during mixing. The static mixer may fail with aggressive chemistries if compatibility is not considered, such as, for example, when mixing two acids or two strong bases, or materials capable of swelling the static mixer material.

FIG. 2A-2D represent different examples of surface structures 16 on a surface 14 of an element of a static mixer 10.

Figure 2A:
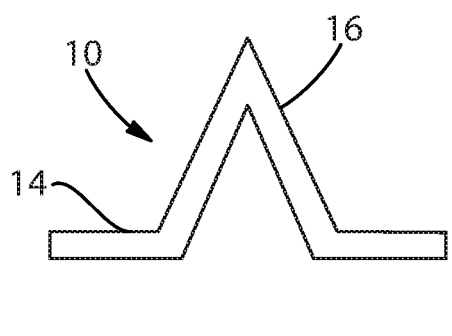
FIGS. 2A-2D represent a surface of a static mixer.
Figure 2B:
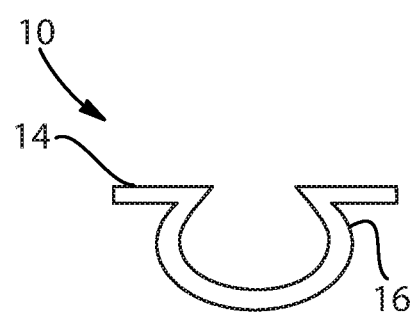
Figure 2C:
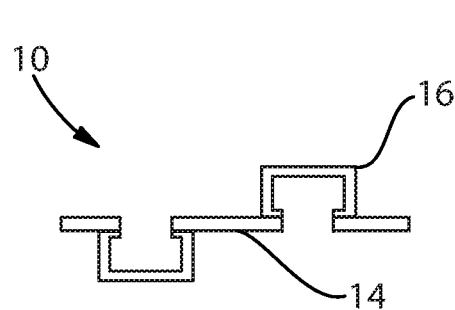
Figure 2D:
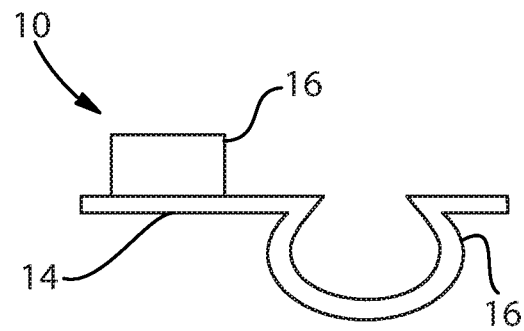

As shown in FIGS. 2A-2C, the surface structure 16 may be above or below the plane of the surface 14. As shown in 2D, the surface structure 16 may or may not create an opening in the opposite side of the planar surface of the element.

Figure 3:
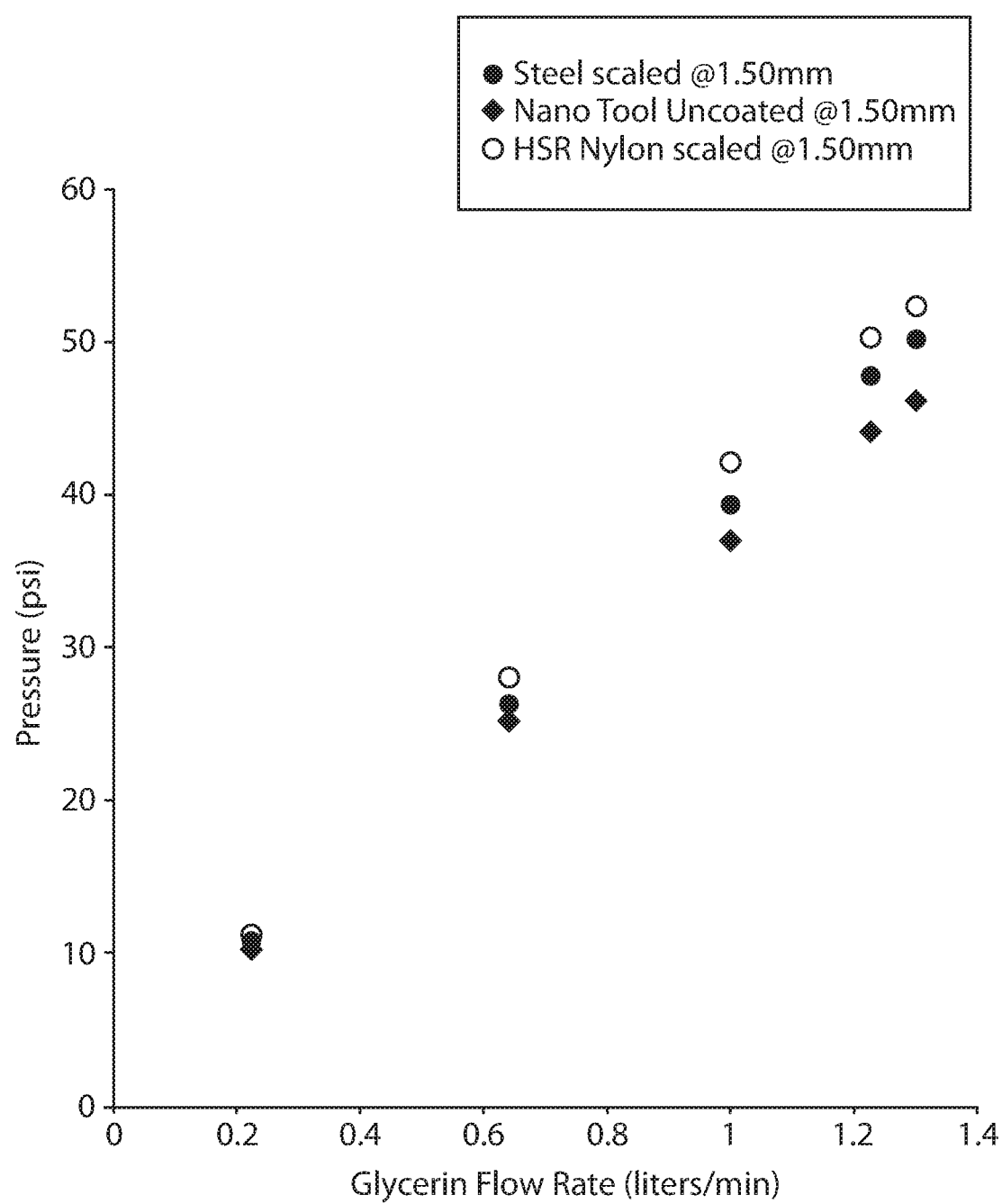
FIG. 3 is a table showing the effects of surface properties of different static mixers on a fluid.

FIG. 3 represents a graph of the back pressure created in a pipe when running glycerin through static mixers that are equivalent in size and only differ by the material of construction. The graph shows the back pressure in the system at different flow rates of glycerin. As shown in FIG. 3, the nylon static mixer and the stainless steel static mixer have higher back pressures than the Nano Tool static mixer at equivalent flowrates of glycerin.

Figure 4:
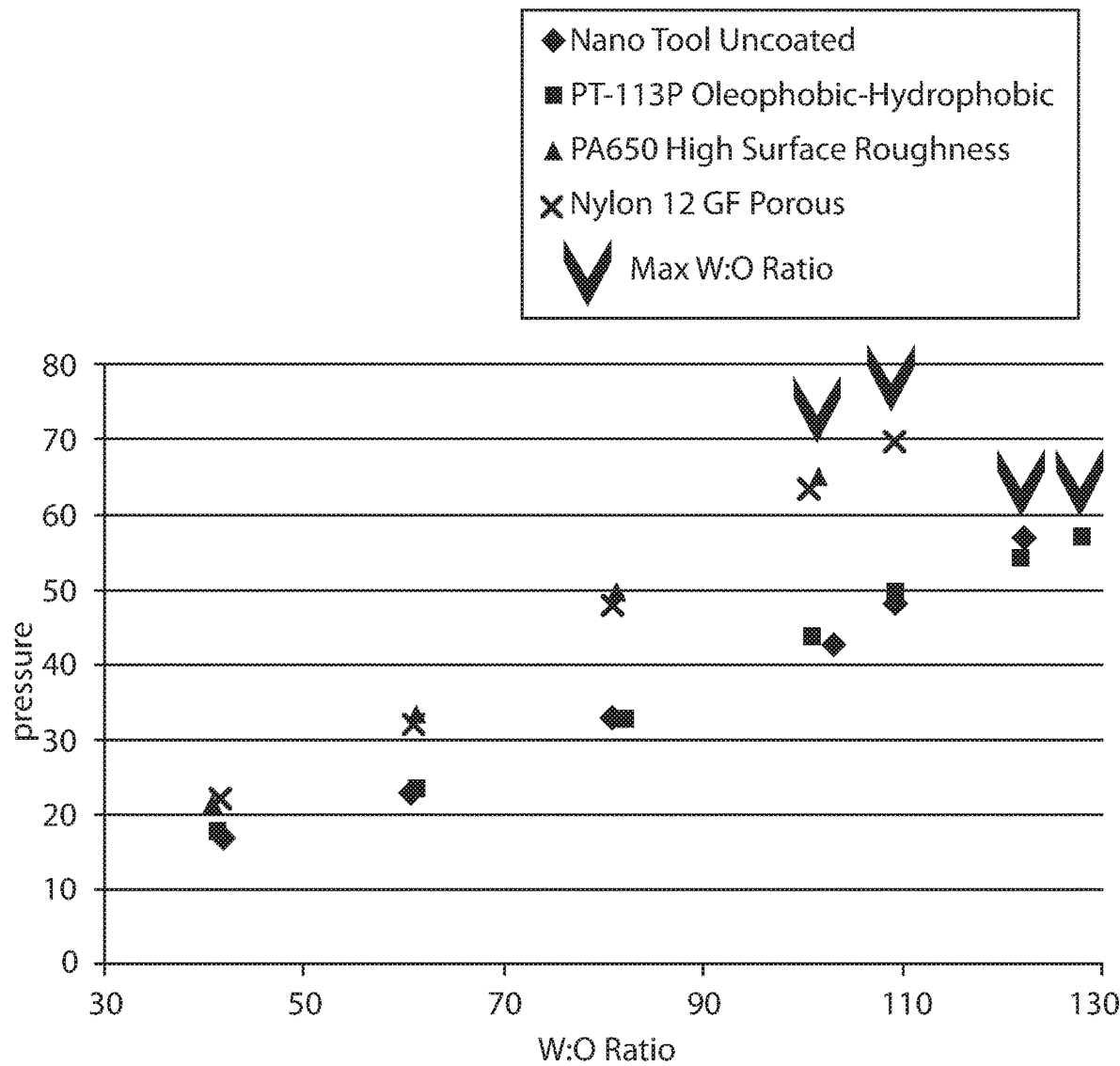
FIG. 4 is a table showing the variant surface energies found for different materials graphed at different pressures for a water to oil emulsion.

FIG. 4 shows four different static mixers graphed according to the back pressure experienced at different water to oil ratios. The chart also marks the highest achievable water to oil ratio for each static mixer. All four static mixers were manufactured using an additive process having the same dimensions. The static mixers are made of four different materials: 1. A porous Nylon 12 GF, 2. PA650 with high surface roughness, 3. PT-113P, and 4. Uncoated Nano Tool. All four static mixers were tested at various water to oil ratios for the amount of back pressure in the system when mixing with the mixers. As shown in FIG. 4, Nano Tool and PT-113P created less back pressure than Nylon or PA650 with High Surface Roughness. Applicants further found that the Nano Tool static mixer and the P-113P mixer can process a higher water to oil ratio. This represents a potential 30% increase in water to oil ratio while still processing with over 10 less psi of back pressure in the system.

As shown in FIG. 4, by impacting the surface and matching the compatibility of the materials used to make the static mixer with the desired fluids being mixed, one can impact the performance of the static mixer and also impact the amount of pressure created by the static mixer in the system for a given set of fluid being mixed.

In conclusion, the method of the present invention provides a static mixer free from sharp corners and edges, gaps, roughness and other imperfections which, in working conditions, would cause dead corners, in connection with the flow of the fluid to be blended. The application of an additive manufacturing process for manufacturing a static mixer allows to obtain all the cited advantages, overcoming the drawbacks of known-type static mixers regardless of the geometry of blending inner structure, which may take up any shape or arrangement, according only to the fluid-dynamic requirements of the compounds to be blended. Further, by using the contact angle of the individual fluids being mixed in relation to the static mixer material, one can choose an appropriate material for the static mixer that allows for reduced back pressure, higher throughput, and greater water to oil ratios when creating emulsions.

Using an additive manufacturing process avoids the need to arrange individual components to be assembled later, thereby introducing imperfections, angles, edges and discontinuities and, on the other hand, it allows to have an inner blending structure which extends to the pipe wall, hence performing the stirring and turbulence action precisely in the area wherein the flow tends instead to slow down and to have a laminar trend.

A remarkable advantage provided by such static mixer is finally that of allowing custom-made manufacture according to the individual client's requirements. As a matter of fact, in the manufacturing process according to the present invention there is no intermediate industrial step between the one of the preparation of a three-dimensional mixer drawing and that of the manufacture thereof. This hence allows to have very high manufacturing flexibility, so as to offer, for each specific application, a static mixer of suitable performance, thereby clearly deviating from the known art which instead puts on the market a very limited number of mixer types, among which the user is forced to choose, renouncing a priori an optimization of the mixer in view of the specific application thereof.

The mixer has been illustrated with reference to multiple embodiments shown in the accompanying drawings; however, it is clear that the invention is in no way limited to such embodiments which are merely given as examples; the scope of protection of the invention being solely defined by the contents of the accompanying claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A method of making an emulsion, the method comprising:
   providing a static mixer having a smooth surface and made from a material;
   providing a first fluid that has a first contact angle with the surface,
   providing a second fluid that is immiscible with the first fluid and has a second contact angle with the surface,
   wherein the first fluid and the second fluid are combined at a water-to-oil ratio greater than 70; and
   mixing the first fluid with the second fluid using the static mixer wherein the first contact angle and the second contact angle are both between 0 degrees and 30 degrees.

2. The method of claim 1, wherein the static mixer and a pipe housing the static mixer are a unitary construction.

3. The method of claim 1, wherein the method further comprises making the static mixer using an additive manufacturing process.

4. The method of claim 1, wherein the static mixer exhibits one or more surface characteristics, wherein the surface characteristics comprise one or more surface structures, porosity, and combinations thereof.

5. The method of claim 1, wherein the method further comprises manufacturing the static mixer by a step selected from the group consisting of selective sintering, stereolithography, fused deposition modeling and selective laser melting, and combinations thereof.

* * * * *